United States Patent [19]
Wical

[11] Patent Number: 5,930,788
[45] Date of Patent: Jul. 27, 1999

[54] DISAMBIGUATION OF THEMES IN A DOCUMENT CLASSIFICATION SYSTEM

[75] Inventor: Kelly Wical, San Carlos, Calif.

[73] Assignee: Oracle Corporation, Redwood Shores, Calif.

[21] Appl. No.: 08/895,773

[22] Filed: Jul. 17, 1997

[51] Int. Cl.⁶ .................................................. G06F 17/30
[52] U.S. Cl. .......................... 707/5; 707/4; 707/6; 707/7; 707/104
[58] Field of Search ..................... 707/4, 5, 6, 7, 707/104, 500, 513, 530; 382/112, 175, 178, 190, 202; 380/21; 395/109, 117, 200.34

[56] References Cited

U.S. PATENT DOCUMENTS

| 5,371,807 | 12/1994 | Register et al. | 855/378 |
|---|---|---|---|
| 5,424,947 | 6/1995 | Nagao et al. | 364/419 |
| 5,657,396 | 8/1997 | Rudolph | 382/190 |
| 5,737,734 | 4/1998 | Schultz | 707/5 |
| 5,794,236 | 8/1998 | Mehrle | 707/5 |

*Primary Examiner*—Thomas G. Black
*Assistant Examiner*—Diane D. Mizrahi
*Attorney, Agent, or Firm*—Fliesler, Dubb, Meyer & Lovejoy LLP

[57] ABSTRACT

A document classification system includes disambiguation processing to validate categories that have been preliminarily classified for themes of a document. The themes of a document are preliminarily classified through use of a classification hierarchy that contains a plurality of categories. The disambiguation processing determines, for a theme selected for disambiguation, whether the category preliminarily classified for the theme selected is valid by analyzing the relationships among the category preliminarily classified for the theme and other categories classified for different themes in the document. The disambiguation processing also utilizes a category cross reference database, which comprises a list of category cross reference pairs, to disambiguate categories assigned to themes by pairing a category classified for a theme and other categories classified for other themes in the document and by comparing these category pairs with category cross reference database pairs. If a match occurs, then the categories of a document category pair are validated.

17 Claims, 7 Drawing Sheets

Preliminary Document Classification Profile

| Document Themes | Theme Concept | Parent Theme Concept |
|---|---|---|
| Theme$_{(1)}$ | Theme Concept$_{(1)}$ | Parent Theme Concept$_{(1)}$ |
| Theme$_{(2)}$ | — | — |
| Theme$_{(3)}$ | Theme Concept$_{(3)}$ | Parent Theme Concept$_{(3)}$ |
| ⋮ | ⋮ | ⋮ |
| Theme$_{(n)}$ | Theme Concept$_{(n)}$ | Parent Theme Concept$_{(n)}$ |

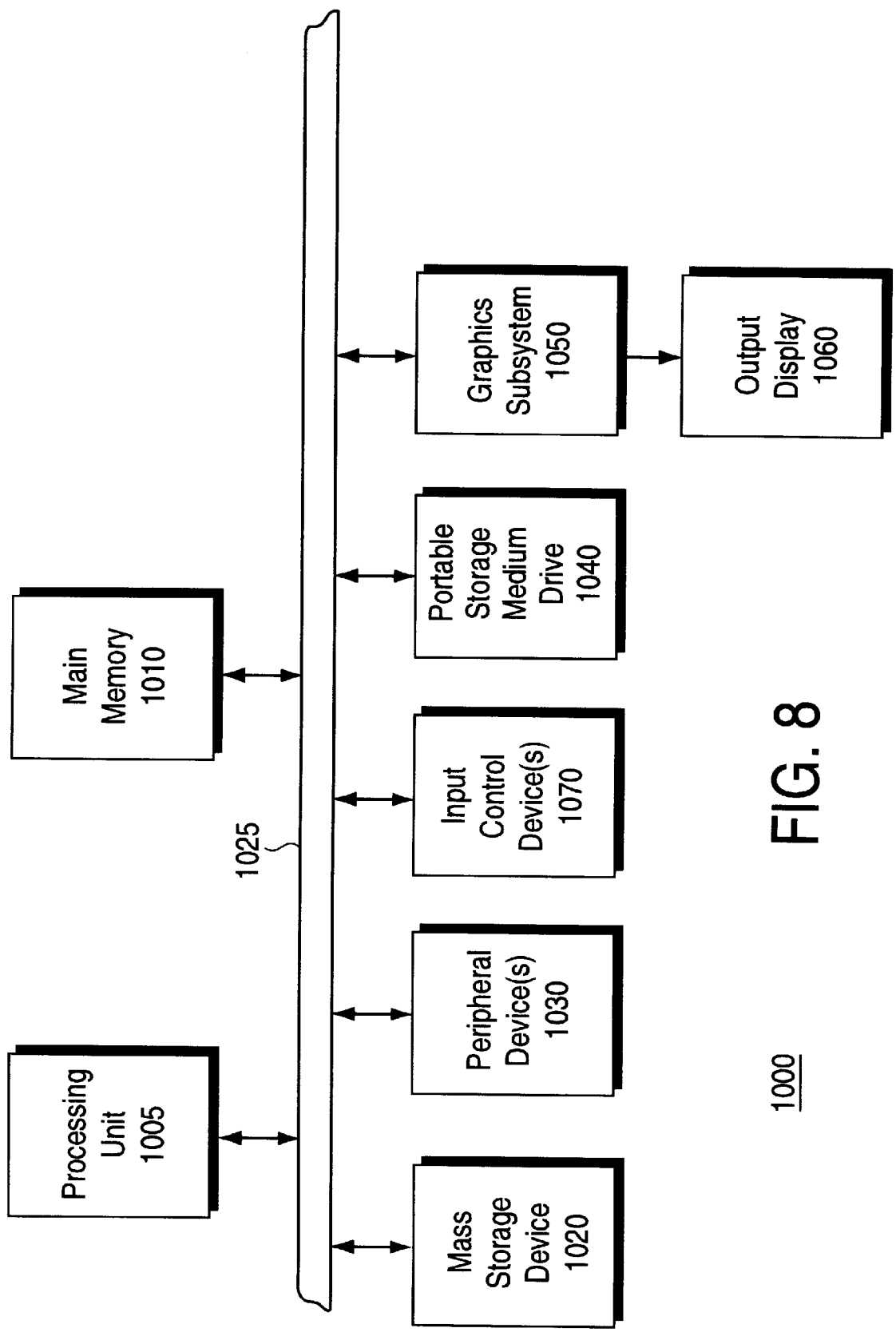

DISAMBIGUATION OF THEMES IN A DOCUMENT CLASSIFICATION SYSTEM

COPYRIGHT NOTICE

Category Cross Reference Pairs, included as part of the specification contains material which is subject to copyright protection. The copyright owner has no objection to the facsimile reproduction of this material as it appears in the United States Patent and Trademark patent files or records, but otherwise reserves all copyright rights whatsoever.

BACKGROUND OF THE INVENTION

1. Field of the Invention

The present invention is directed toward the field of document classification, and more particularly toward disambiguating or validating categories preliminarily classified for documents.

2. Art Background

Documents, which include books, magazines, journals, etc., are often stored in a single repository, such as a library or an online database. The repository may store a vast number of documents that cover numerous topics. Typically, the documents in the repository are organized so that a user may locate selected documents of interest. To typically locate documents in a repository, the documents are classified. For example, libraries typically use the Dewey decimal system to classify books and other publications into ten major categories, wherein each category is further subdivided by a number.

In general, a document classification system classifies documents into one or more categories. U.S. patent application, Ser. No. 08/520,499, filed Aug. 29, 1995 now pending, entitled "A Virtual Bookshelf", inventor Kelly Wical, describes a document browsing system. The virtual bookshelf described in the above-identified United States Patent Application catalogs documents available to a user based on the themes identified for each document. The themes are identified from terminology used in the document. A classification hierarchy, which includes categories, is used to classify the themes or terms of a document into categories.

In order to classify documents based on document terminology, a general meaning must be ascribed to the terminology. Generally, the meaning ascribed to terminology should be based on the context or use of the term in the document. For example, a document may include the term "bank." Without any information on the contextual use of the term, "bank" may be associated with the category "finance & investment" to connote a financial institution, or "bank" may be associated with the category "bodies of water" (e.g., the bank of a river). Thus, to properly classify a document based on terminology in the document, the proper context of the terminology must be determined. Note that in a document classification system, if a document is misclassified because the wrong category is ascribed to a term, then the document is effectively lost for that term.

As is set forth in detail below, a disambiguation system of the present invention disambiguates or validates categories, which have been preliminarily classified for a term, to provide proper classification for terms.

SUMMARY OF THE INVENTION

A document classification system includes disambiguation processing. The disambiguation processing validates categories that have been preliminarily classified for terms in a document. In one embodiment, the terms are themes that define the content of the document. A classification hierarchy contains categories arranged in a hierarchical relationship. The terms of a document are classified through use of the classification hierarchy such that a preliminary document classification profile indicates, for terms not completely ambiguous, a category of the classification hierarchy. The disambiguation processing determines, for terms assigned a category, whether a category classified for a term is valid by analyzing other categories classified for other terms of the document.

In one embodiment, the disambiguation processing determines, for a term selected for disambiguation, whether the category preliminarily classified for the term selected is valid by analyzing the relationships among the category preliminarily classified for the term and other categories classified for different terms in the document. In another embodiment, the disambiguation processing stores a category cross reference database that comprises a list of category cross reference pairs. The categories of a category pair have a semantic, linguistic, or usage relationship. To disambiguate categories assigned to terms, the disambiguation processing generates document category pairs by combining a category classified for a term and each category classified for other terms in the document. The disambiguation processing also compares the document category pairs with category cross reference database pairs. If a match occurs, then the categories of a document category pair are validated.

BRIEF DESCRIPTION OF THE DRAWINGS

FIG. 8 illustrates a high level block diagram of a general purpose computer system in which the document classification system, including the disambiguation processing software, of the present invention may be implemented.

DETAILED DESCRIPTION OF THE PREFERRED EMBODIMENTS

Document Classification Overview

Figure 1:
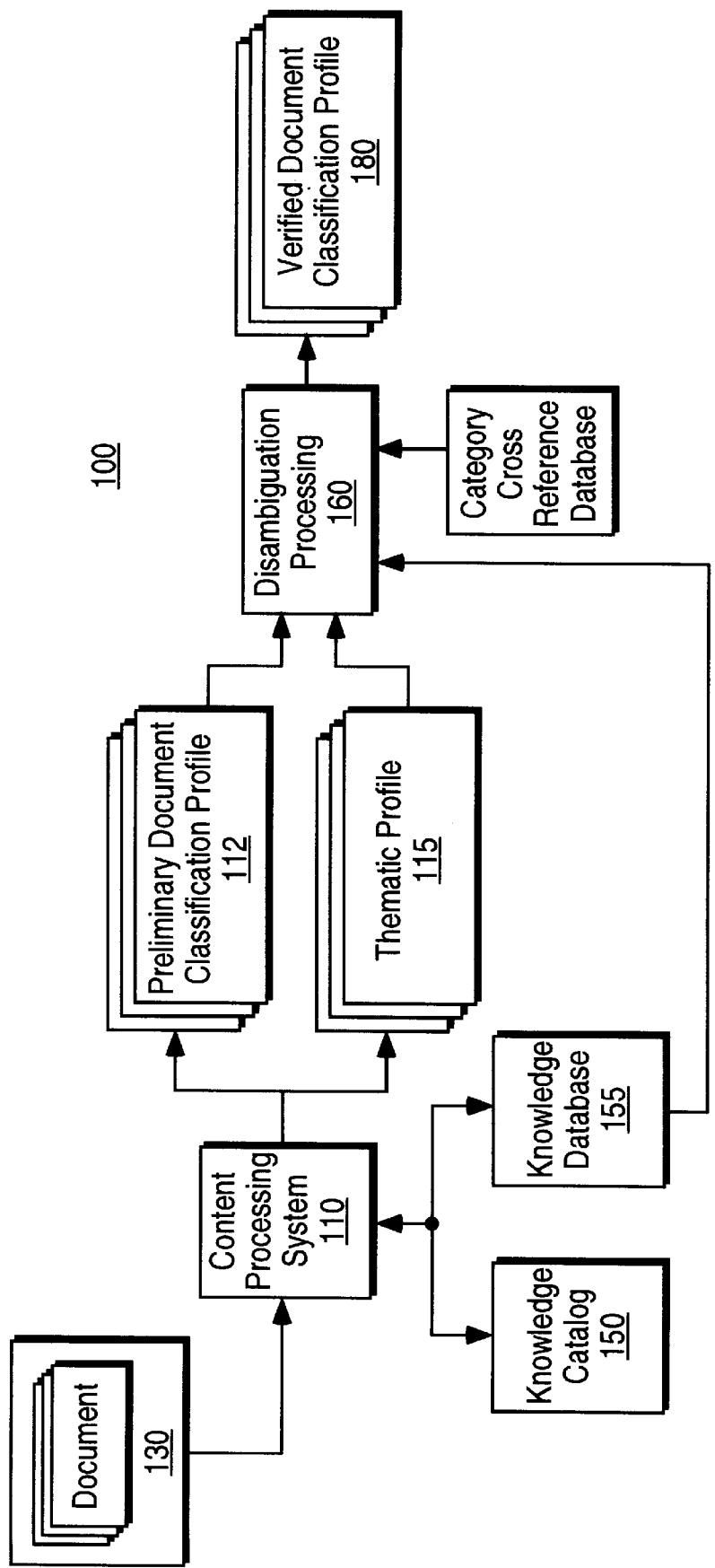
FIG. 1 is a block diagram illustrating one embodiment of a document classification system that includes the classification disambiguation of the present invention.

FIG. 1 is a block diagram illustrating one embodiment of a document classification system that includes the classification disambiguation of the present invention. In general, the document classification system 100 shown in FIG. 1 receives, as input, one or more document(s) 130, and analyzes the document(s) to generate a verified document classification profile 180. The verified document classification profile 180 identifies one or more categories or topics, which have been verified or disambiguated, that classify terms or themes of the document. A document from the documents 130 may include a compilation of source information from any source. For example, the content of the documents 130 may include articles, books, periodicals, etc. In one embodiment, the documents 130 information are stored on a computer system as computer readable text. Also, the documents 130 may be accessed, via a network, and stored at one or more remote locations. The documents 130 is intended to represent a broad category of discourse, and any discourse captured in a computer readable form may be used with the disambiguation processing of the present invention.

In one embodiment, the document classification system 100 operates in conjunction with a content processing system 110. In general, the content processing system 110 analyzes the documents 130, and generates a thematic profile 115 and a preliminary document classification profile 112 for each document. The thematic profile 115 provides a profile of the thematic content in the individual paragraphs as well as the thematic content in the document as a whole (e.g. identifies the content conveyed by the documents 130). Specifically, the thematic profile 115 identifies paragraph themes, for the individual paragraphs, and document themes for each document as a whole.

In one embodiment, the content processing system 110 uses a knowledge catalog 150, which identifies a plurality of categories, to classify categories for the document themes. For this embodiment, the knowledge catalog 150 contains categories, arranged in a classification hierarchy, that reflect a world view of knowledge. Categories extracted from a portion of the knowledge catalog 150 are discussed below in the section "A Disambiguation Example." Also, Appendix A of U.S. patent application Ser. No. 08/455,484 now pending, inventor Kelly Wical, entitled "Method and Apparatus for Determining Theme for Discourse", filed May 31, 1995, which is herein expressly incorporated by reference, is a listing of categories, arranged in a hierarchy, that define one embodiment for a knowledge catalog for use with disambiguation processing of the present invention. Although the present invention is described in conjunction with a knowledge catalog used to classify documents, any classification hierarchy may be used in conjunction with the disambiguation processing system without deviating from the spirit or scope of the invention.

In general, the content processing system 110 uses the categories in the knowledge catalog 150 to classify the documents 130 in one or more categories to generate the preliminary document classification profile 112. In one embodiment, a list of the categories for each document, a corresponding theme strength as well as a corresponding parent category, are contained in the preliminary document classification profile 112 (See FIG. 3). The content processing system 110 maps, for each document, document themes, identified in the thematic profile 115, to categories of the classification hierarchy (e.g., knowledge catalog 150). For example, a classification hierarchy may include a category for "Operating Systems", located beneath a parent category "Computer Software." The content processing system 110, in analyzing a document, may identify "operating systems" as a document theme. For this example, the content processing system 110 maps or links the document theme "Operating Systems" to the portion of the classification hierarchy containing the "Operating Systems" category. Accordingly, for this example, the document is preliminarily classified as containing topics relating to operating systems. A further explanation of preliminary classification of themes and terminology is described below in the section "A Content Processing System."

The content processing system 110 also dynamically generates categories, during content processing, to extend the classification hierarchy to include additional categories that classify terminology specific to the documents 130. For example, a general classification hierarchy, which includes only high level categories to cover a broad range of subject matter, may include a category for "Operating Systems." The content processing system 110 may identify "OS/2", a specific type of operating system, as a document theme or term. For this example, the content processing system 110 extends categories of the classification hierarchy by dynamically generating a category for "OS/2." The content processing system 110 generates the category for "OS/2" based on the contextual use of the term "OS/2" in the document (e.g, the use of the term "OS/2" as a specific type of operating system). The dynamically generated category, "OS/2", is linked to the "operating systems" category. The process of dynamically generating and linking categories, based on terminology contained in the documents 130, results in generation of a knowledge base 155 particular to a set of documents. The process for extending categories is described more fully below in the section "Dynamic Classification of Terminology."

A content processing system for use with the disambiguation processing of the present invention is described more fully below in the section entitled "A Content Processing System." Although the present invention is described in conjunction with a content processing system that analyzes documents to provide a rich and comprehensive thematic profile of the documents as well as a preliminary classification of the documents, any content processing system that classifies terms may be used in conjunction with the disambiguation processing of the present invention without deviating from the spirit or scope of the invention.

As shown in FIG. 1, disambiguation processing 160 receives the preliminary document classification profiles 112 and thematic profiles 115 for the documents 130. The disambiguation processing 160 also utilizes the knowledge base 155, and a category cross reference database 170. The cross reference database 170 includes category pairs, wherein the categories of a category pair relate semantically or linguistically. For example, the category "drinking and dining" is paired with the category "building and dwellings" because themes or terms classified under the category "drinking and dining" are related to, and thereby support, themes classified under the category "buildings and dwellings." The section entitled Category Cross Reference Pairs contains a list of category pairs configured in accordance with one embodiment for implementing a category cross reference database. The list of category pairs in the Category Cross Reference Pairs section is intended to be an example cross reference database, and the list of categories may be modified without deviating from the spirit and scope of the invention.

Disambiguation Processing Overview

To verify or disambiguate categories, the disambiguation processing 160 uses the preliminary document classification profiles 112 and thematic profiles 115 for documents 130, and generates the verified document classification profile 180 by referencing the knowledge base 155 and category cross reference database 170. The disambiguation processing 160 uses the knowledge base 155 to analyze hierarchical relationships among categories preliminarily classified for a document. For example, a document may include the term "OS/2." The term "OS/2" may connote a type of operating system, or the term "OS/2" may be an acronym that defines a term unrelated to computer software. For this example, if the preliminary document classification profile 112 for a document includes the categories "operating systems" and "computer software", then the category "OS/2", preliminarily classified under the "operating systems" category, is validated as a type of operating system.

The disambiguation processing 160 utilizes the category cross reference database 170 to validate a classification based on the category pairs. For example, the category "computer multimedia" is validated as a proper classification if the document also includes themes classified in the category "computer software industry" because the category pair "computer_multimedia & computer_software_industry" is located in the category cross reference database 170. For this example, the categories "multimedia" and "computer software industry" would appear in the verified document classification profile 180.

In one embodiment, the disambiguation processing 160 operates under the notion that a classification in the preliminary document classification profile 112 is inaccurate until that classification can be disambiguated or validated. If the category can not be validated, then the document is not classified in that category (e.g., the category is not included on the verified document classification profile 180 for that document). The underlying theory of operation for the disambiguation system of the present invention is that themes are not classified for a document if the themes are not verified. Thus, themes are not classified for a document in lieu of classifying themes in the wrong category. Consequently, categories contained in the preliminary document classification profile 112 do not appear in the verified document classification profile 180 if the classification can not be verified.

The disambiguation processing of the present invention validates categories to provide a relatively high level of assurance that a document contains themes in the category for which it was classified. However, a level of ambiguity may still exist for a validated classification such that truly unambiguous terms generally do not exist. For example, if a speaker introduces, without prior context, the term "Paris", most people (e.g. 99%) would ascribe the meaning of "Paris, France" and not "Paris, Texas." For this example, the level of ambiguity in using the term Paris to mean Paris, France is relatively low. However, even for a level of ambiguity this low, the disambiguation processing of the present invention still attempts to validate the category "France" for the term "Paris" through use of the disambiguation techniques described herein.

In general, proper nouns are naturally ambiguous because any particular person, location or item may have any name. The disambiguation processing of the present invention realizes that although proper nouns are naturally ambiguous, there is a realistic level of recognition for some proper nouns. The disambiguation processing 160 operates under a rebuttable presumption for some commonly recognized proper nouns. As noted above when validating a category for the proper noun "Paris", a presumption exists that "Paris" relates to the category "France." However, if during the disambiguation process, no additional corroborating categories are classified for that document, then the term "Paris" is no longer classified with the category "France."

Some terms may be characterized as truly ambiguous. In general, a term is ambiguous if the term may be mapped or linked to more than one category in the classification hierarchy (e.g., the knowledge catalog 150). For example, the term "plant" is truly ambiguous because the term may be associated with a manufacturing plant, a plant as a living organism, or plant as a verb (e.g. plant your foot before executing the gymnastic maneuver). Because the term "plant" is truly ambiguous, the content processing system 110 does not attempt to classify the term in a category in the preliminary document classification profile 112, and the disambiguation processing 160 does not subsequently disambiguate a category classified for the ambiguous term.

Thematic Profiles

For the document classification system 100 embodiment shown in FIG. 1, the content processing system 110 classifies terms from the documents 130 to generate the preliminary document classification profile 112. In one embodiment, the content processing system 110 classifies "n" of the most important document themes for that document. The present invention is described in conjunction with classification of document themes. However, the disambiguation processing of the present invention may operate on any term selected from a document regardless of whether the term is identified as a theme.

Figure 2:
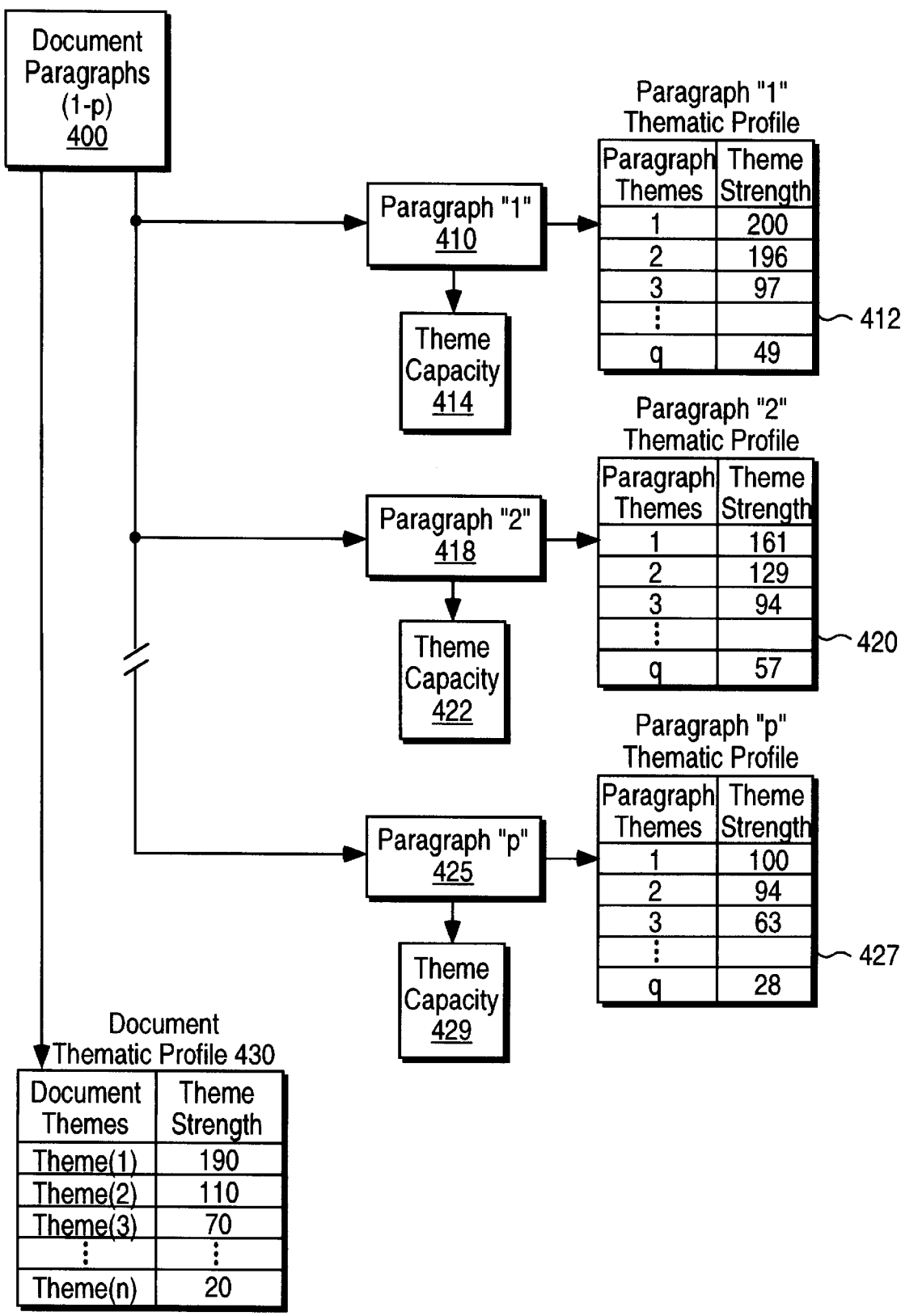
FIG. 2 is a block diagram depicting generation of paragraph thematic profiles for individual paragraphs of a document as well as document thematic profiles for the document as a whole.

The content processing system 110 (FIG. 1) generates the thematic profile 115, including paragraph thematic profiles and document thematic profiles. FIG. 2 is a block diagram depicting generation of paragraph thematic profiles for individual paragraphs of a document as well as document thematic profiles for the document as a whole. A document 400, which contains "p" paragraphs, is divided out into the "p" individual paragraphs (e.g. paragraph "1" 410, paragraph "2" 418, and paragraph "p" 425). As shown in FIG. 2, for paragraph "1" 410, paragraph "2" 418, and paragraph "p" 425, paragraph thematic profiles 412, 420, and 427 are generated, respectively. Also, for each paragraph, a theme capacity is calculated (e.g. theme capacity 414 for paragraph "1" 410, theme capacity 422 for paragraph "2" 418, and theme capacity 429 for paragraph "p" 425). In general, the paragraph thematic profile identifies the most important themes or topics contained in that paragraph. The paragraph thematic profile only reflects the content (e.g. themes) identified in that paragraph. A list of one or more paragraph themes, 1-q, is shown in the first column of each paragraph thematic profile (e.g., paragraph thematic profile 412, 418, and 427 in FIG. 2).

For each paragraph theme, a theme strength or theme weight is calculated. The theme strength measures content of an individual theme. Example theme strengths are shown in the second column of each paragraph thematic profile (e.g. paragraph thematic profile 412, 420, and 427). The theme strengths quantify the strength or importance of a corresponding paragraph theme relative to other paragraph themes. Thus, the theme strength is a relative measure of paragraph theme importance to other paragraph themes. The paragraph themes are ordered in the paragraph thematic profiles (412, 422 and 427) based on the relative theme strengths, (e.g. the most important paragraph theme, which has the largest theme strength, is listed as theme number 1, and the least important theme, which has the smallest theme strength, is listed as theme "q"). In one embodiment, the sixteen most important paragraph themes are identified in a paragraph thematic profile.

The theme capacity (e.g. theme capacities 414, 422, and 429), expressed as a quantitative value, measures the content value of the paragraph as a whole. The theme capacity is a relative measure such that a theme capacity value is a relative comparison with other paragraphs in the document. The theme capacity for a paragraph often depends upon the writing style.

In one embodiment, the thematic profile 115 includes a list of themes, listed in order of importance, that define the content of the document. As shown in FIG. 2, a document thematic profile 430 contains the "n" most important document themes contained in the corresponding document 400. In addition, the document thematic profile 430 includes an overall theme strength, for each corresponding theme, that reflects the importance of the document theme in the overall content of the document. In one embodiment, the document thematic profile 430 contains the sixteen most important document themes (e.g. n=16).

Preliminary Document Classification Profile

Figures 3, 4:
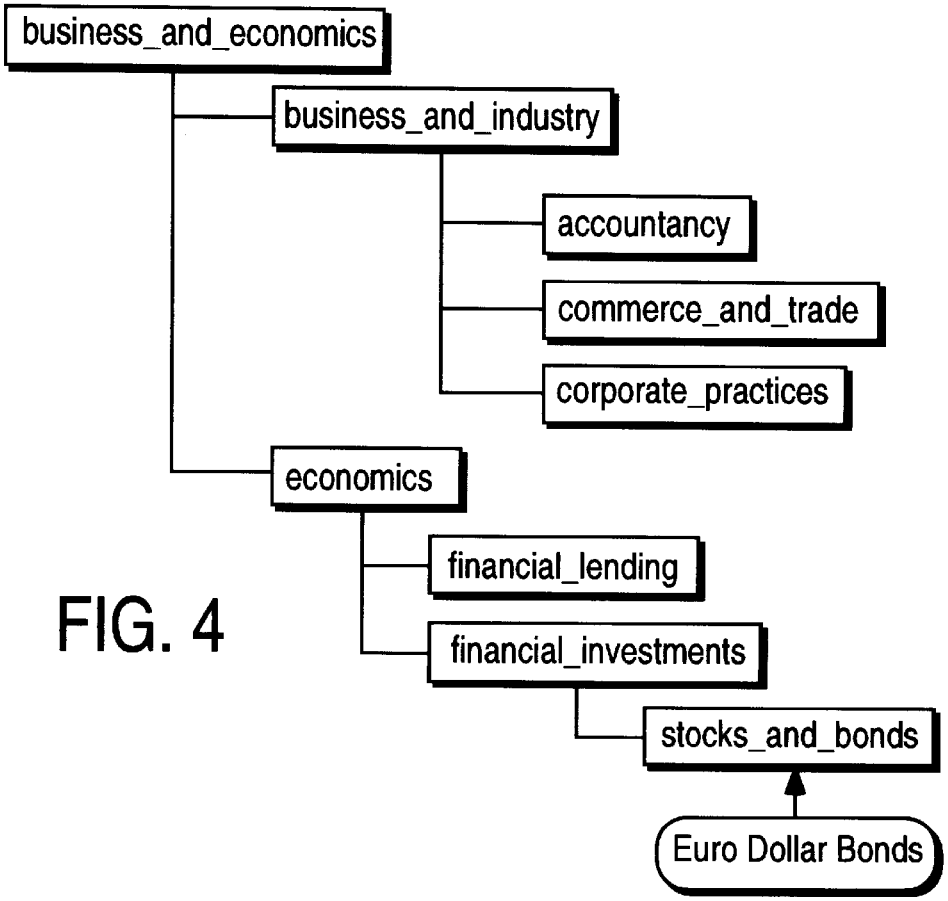
FIG. 3 illustrates one embodiment for a preliminary document classification profile for a document.
FIG. 4 illustrates an example preliminary document classification profile depicted as a portion of a classification hierarchy.

FIG. 3 illustrates a preliminary document classification profile for a document. The first column of the preliminary document classification profile contains a list of document themes, labeled $theme_1$-$theme_n$. Alternatively, the preliminary document classification profile may include a list of terms for disambiguation. For each document theme, a column, labeled "theme concept", lists, if applicable, a category preliminarily classified for the corresponding document theme. The theme concept is extracted from a classification hierarchy (e.g. the knowledge base 155). For example, the content processing system 110 may extract the category "operating systems" as a theme concept for the document theme "OS/2." As shown in FIG. 3, there is no theme concept for $theme_2$. This indicates that $theme_2$ is truly ambiguous such that there may be multiple entries in the classification hierarchy for $theme_2$. For example, if $theme_2$ is the term "plant", then $theme_2$ is not classified, and no theme concept is extracted from the classification hierarchy.

The third column of the preliminary document classification profile shown in FIG. 3 includes a list of parent theme concepts, one for each corresponding theme concept. The parent theme concept is a category from the classification hierarchy located in the next highest level of the hierarchy above the theme concept. For example, in an example classification hierarchy, if the theme concept is "operating systems", then the parent theme concept, may be "computer software industry." Thus, for this embodiment, the preliminary document classification profile stores two levels of classification categories for a theme or term.

The document themes may themselves be categories in the classification hierarchy. Alternatively, the document themes may be index heads which do not have a direct entry in the classification hierarchy. If the document theme is a category in the classification hierarchy, then the theme concept is extracted as the parent category for the document theme, and the parent theme concept is extracted from the parent category of the theme concept. Index heads are described more fully below in the section "Dynamic Classification of Terminology."

FIG. 4 illustrates an example preliminary document classification profile depicted as a portion of a classification hierarchy. The names for each category of the classification hierarchy are encompassed in a rectangular box (e.g. stocks and bonds, financial investments, financial lending, etc.). The document theme or term is shown circled (e.g. Eurodollar bonds). For the "Eurodollar bond" example, the theme concept is the category "stocks and bonds", and the parent theme concept is the category "financial investments." For a second example shown in FIG. 4, the classification hierarchy category "corporate practices" is the document theme (e.g. the document theme is a category in the classification hierarchy). For this second example, the theme concept is "business and industry", and the parent theme concept is "business and economics."

Disambiguation Processing Embodiments

Figure 5:
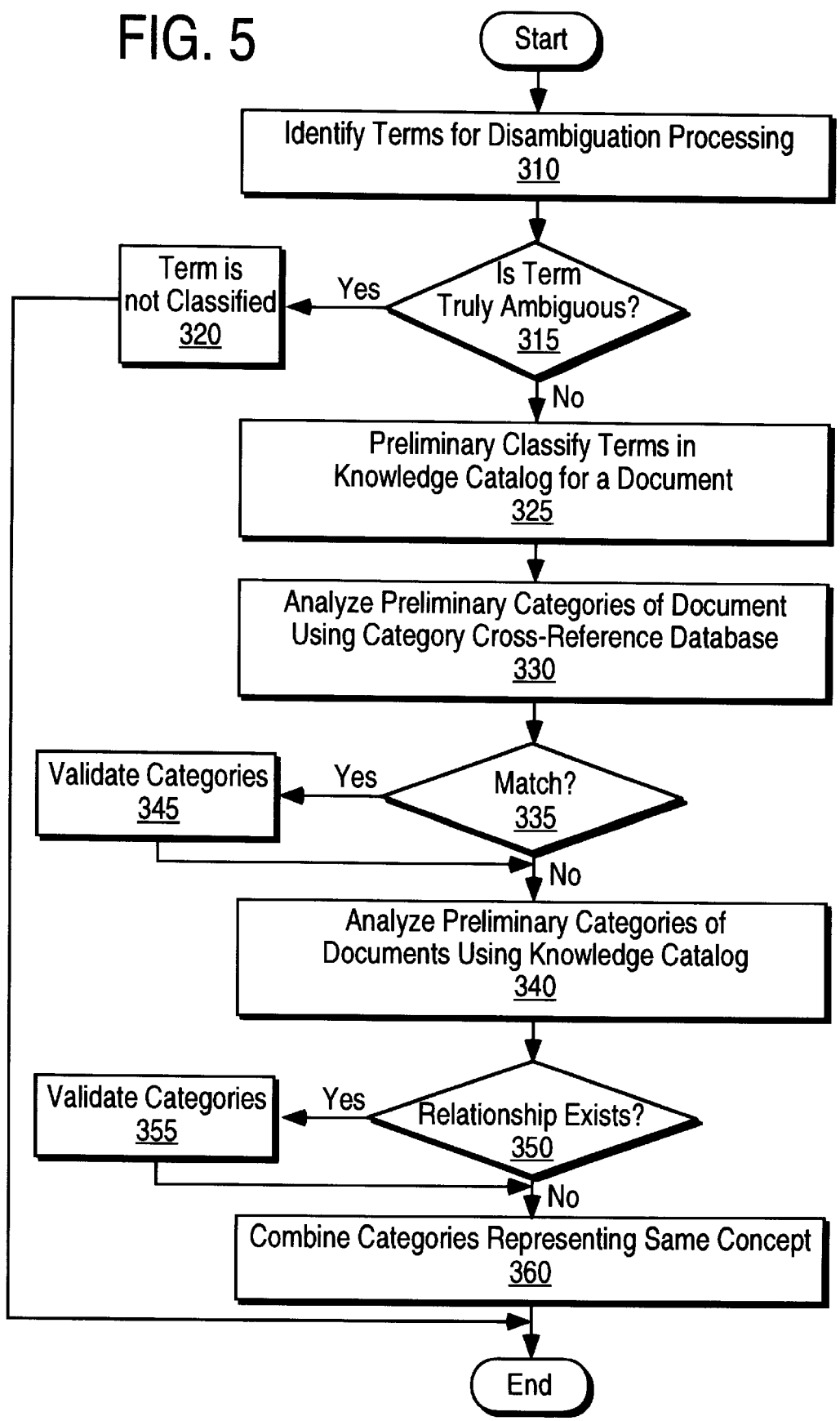
FIG. 5 is a flow diagram illustrating one embodiment for disambiguation processing.

FIG. 5 is a flow diagram illustrating one embodiment for disambiguation processing. As shown in block 310, terminology or document themes are identified for disambiguation processing. In one embodiment, only single words, and not phrases, are identified for disambiguation processing. As discussed above, the disambiguation processing 160 selects terms for disambiguation by weeding out truly ambiguous terms. If the term is truly ambiguous, then the term is not classified as shown in blocks 315 and 320 of FIG. 5. If the term is not truly ambiguous, then a preliminary classification is assigned to the term through use of a classification hierarchy as shown in blocks 315 and 325. The disambiguation processing 160 analyzes preliminary categories of documents using the category cross reference database 170 as shown in block 330. If there is a match between categories in the preliminary document classification profile and category pairs in the category cross reference database 170, then the disambiguation processing 160 validates the two categories that constitute the category pair match as shown in blocks 335 and 345.

The disambiguation processing next analyzes categories of the preliminary document classification profile to determine if hierarchical relationships exist as defined in the classification hierarchy as shown in block 340. If validating relationships exist in the classification hierarchy, then the associated categories are validated as shown in block 355. Also, as shown in block 360, the disambiguation processing combines categories that represent the same concept.

As discussed above, the category cross reference database contains a list of category pairs that validate a classification of a term or theme. In one embodiment, the disambiguation processing 160 utilizes the category cross reference database 170 to analyze categories in the preliminary document classification profile 112 for a document. As shown in FIG. 3, the preliminary document classification profile for a document includes categories from two levels of the classification hierarchy (i.e., the theme concept and the parent theme concept). To verify categories, the disambiguation processing compares every combination of categories identified as theme concepts and parent theme concepts. If a document theme is not chosen to disambiguate, then the theme concept and parent theme concept for that document theme are not chosen.

For the preliminary document classification profile shown in FIG. 3, the disambiguation processing, to analyze all theme concepts with the category cross reference database, selects theme $concept_1$ and theme $concept_3$ to compare against category pairs in the category cross reference database 170. Theme $concept_2$ is not chosen because no theme concept was extracted from the classification hierarchy. The disambiguation processing 160 compares theme concept pairs from the preliminary document classification profile to category pairs in the category cross reference database 170 taking into account the order of the pair. For example, the disambiguation processing compares both the theme $concept_1$/theme $concept_3$ and the theme $concept_3$/theme $concept_1$ pairs to category pairs in the category cross reference database.

The disambiguation processing 160 also compares all combinations of parent theme concept pairs to category pairs of the category cross reference database 170. The disambiguation processing 160 further generates pairs from all combinations of theme concepts and parent theme concepts in the preliminary document classification profile (e.g., parent/child category pairs). For example, theme concept$_1$ is paired with each parent theme concept (e.g., parent theme concept$_1$, parent theme concept$_3$, . . . parent theme concept$_n$). Accordingly, all permutations of existing theme concepts and parent theme concepts are paired for comparison to the category cross reference database. An example of using the category cross reference database to validate document terms is described below in the section "A Disambiguation Example."

In one embodiment, the disambiguation processing analyzes the preliminary document classification profile to validate categories based on the theme concepts and parent theme concepts themselves to perform support style disambiguation. A first test in the support style disambiguation includes validating theme concepts by analyzing themes of two purportedly related document themes. For example, in a document about different wines, theme$_1$ may be "wines", and theme$_2$ may be "merlot." For the "wines" theme, the theme concept$_1$ may be "alcoholic beverages." Theme concept$_2$, corresponding to the "merlot" theme, may be "wines." Based on this preliminary document classification profile, the disambiguation processing attempts to validate the "wines" theme concept for the term "merlot." Because "wines" is both a theme and a theme concept, the disambiguation processing compares the theme weight of the term "wines" with the theme term is "merlot." If the theme weight of the term "wines" is greater than the theme weight of "merlot", then there must be more than a single term classified under the "wines" category. Note that a system may only select the top "n" document themes, such that another wine, such as "chardonnay", may not appear as a document theme although may appear in the document. Because the theme weight of "wines" is greater than the theme weight of "merlot", the wines category is validated.

A second test for support style disambiguation identifies theme concepts and parent theme concepts in the document themes. For example, to disambiguate or validate the term "merlot", the disambiguation processing searches for the category "wines" or the parent category of "wine", "alcoholic beverages", as a document theme. If "wine" or "alcoholic beverages" are document themes, then the disambiguation processing validates "merlot" as a wine.

The disambiguation processing of the present invention distinguishes between the different categories selected as theme concepts and categories that arise as document themes. For purposes of validation, a term used in the document, which subsequently becomes a document theme, is different from a category selected based on terminology used in the document. For example, if document themes included "merlot", "fume blanc", and "chardonnay", and the category "wines" manifested as a theme concept for "merlot", then the category "wines" is in itself not ambiguous. However, if the term "wine" appears as a document theme, then the term requires validation or disambiguation.

Another support style disambiguation test sums the theme weights of document themes for comparison against a theme weight for another document theme that is also the theme concept for the first themes. Table 1 below is an example preliminary document classification profile.

TABLE 1

| Theme | Theme Strength | Theme Concept |
|---|---|---|
| wines | 50 | alcoholic beverages |
| merlot | 20 | wines |
| fume blanc | 5 | wines |
| chardonnay | 5 | wines |

For example, the theme concept "wines", a document theme, has a greater theme weight than all of the themes that have "wines" as a theme concept (i.e., merlot, fume blanc, and chardonnay). Furthermore, if a parent theme concept has a greater weight than the theme concept itself, then the theme concept is validated. Generally, if a theme concept is not supported, then the parent theme concept is also not supported.

A Disambiguation Example

The following paragraph illustrates an example for which categories are validated from a preliminary document classification profile. The example paragraph is from a document about commercial banks lowering interest rates based on changes to the Federal funds rate.

Treasury bill yields dropped substantially Friday morning in anticipation of further reductions in the Federal funds rate by the Fed, market watchers said. The 3-month bill fell 8 basis points to a discount equivalent rate of 7.70%, while the 1-year bill was down 12 basis points to 7.30%.

Table 2 illustrates the theme profile for the example paragraph. As shown in Table 2, for each theme, the theme profile includes a theme strength and a theme concept, and a parent theme concept.

TABLE 2

| # | Theme Strength | Themes | Theme Concept | Parent Theme Concept |
|---|---|---|---|---|
| 1 | 43 | banking | finance and investment | economics |
| 2 | 25 | basis points | stocks, bonds, and commodities | finance and investment |
| 3 | 24 | treasury bill yields | banking | finance and investment |
| 4 | 22 | stocks, bonds, and commodities | finance and investment | economics |
| 5 | 22 | points | stocks, bonds, and commodities | finance and investment |
| 6 | 21 | yields | banking | finance and investment |
| 7 | 17 | bills | bills | |
| 8 | 12 | federal fund rates | banking | finance and investment |
| 9 | 11 | reductions | banking | finance and investment |
| 10 | 10 | rates | banking | finance and investment |
| 11 | 9 | discount equivalent | commerce and trade | business and industry |
| 12 | 9 | three-month | three-month | |
| 13 | 8 | 1-year | 1-year | |
| 14 | 8 | rates | commerce and trade | business and industry |
| 15 | 7 | discounts | commerce and trade | business and industry |
| 16 | 7 | equivalents | equivalencies | |

Figure 6A:
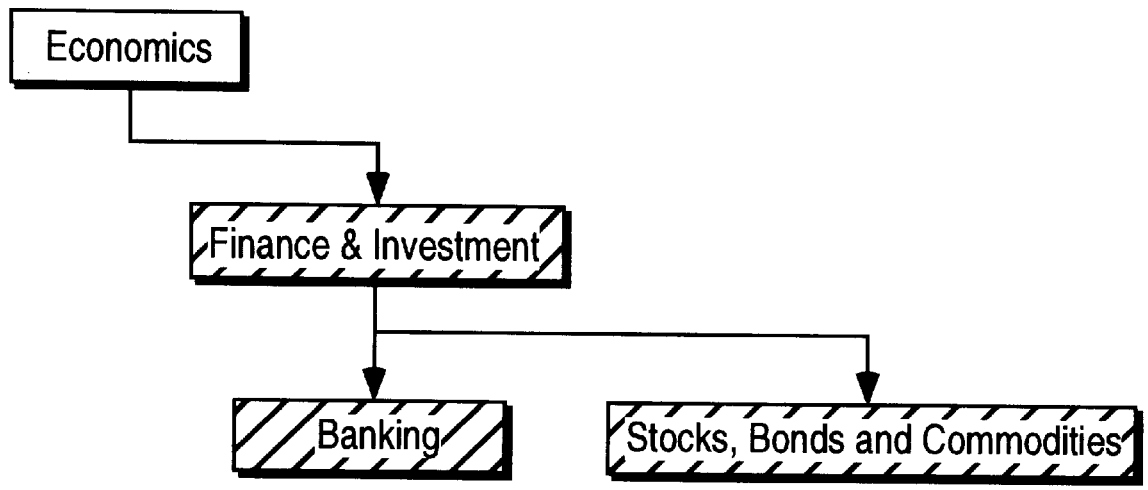
FIG. 6a illustrates a portion of a classification hierarchy for "economics."
Figure 6B:
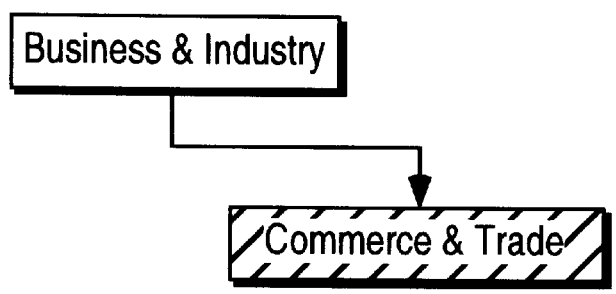
FIG. 6b illustrates a portion of a classification hierarchy for "business and industry."

Based on the theme strength, the theme terms are listed in the order of importance in the paragraph. Note that the term "banking" does not appear in the paragraph. However, because "banking" is a theme concept for several of the themes, the concept of "banking" is listed as a theme itself. Through use of the knowledge catalog 150, "banking" is conceptualized to "finance and investment" as shown in Table 2. FIG. 6a illustrates a portion of a classification hierarchy for "economics", and FIG. 6b illustrates a portion of a classification hierarchy for "business and industry." For this example, the content processing system 110 maps the themes to the above portions of the classification hierarchy. This example illustrates the fact that a theme profile may contain terms not in the original document. For example, the theme "basis points" is conceptualized by the content processing system to "stocks, bonds, and commodities." The term "stocks, bonds, and commodities" does not appear in the original input example. The theme vector processor 750 (FIG. 7) determines that the theme concept "stocks, bonds, and commodities" is developed significantly enough to be designated as the fourth most important theme for the paragraph.

For this example preliminary document classification profile, the disambiguation processing uses the category cross reference database 170 to determine whether there is a match. Specifically, the disambiguation processing generates document category pairs from the categories listed under the column "theme concept." For example, the disambiguation processing generates the document category pair "finance_investment & stocks_bonds_commodities" for comparison with category cross reference database category pairs. For this preliminary document classification profile example, there are no matches using the theme concepts.

The disambiguation processing also compares parent document category pairs with cross reference database category pairs. The cross reference database includes the pairs "business_industry & economics" and "business_industry & financial_investment." Thus, a comparison between parent theme concept pairs and categories in the category cross reference database yields matches for parent theme concept pairs: 11/1, 11/4, 11/2, 11/3, 11/5, 11/8, 11/9, 11/10, 14/1, 14/4, 14/2, 14/3, 14/5, 14/8, 14/9, 14/10, 15/1, 15/4, 15/2, 15/3, 15/5, 15/8, 15/9, and 15/10. The themes, which correspond to the parent theme concepts listed above, are validated for their corresponding theme concept. Specifically, theme numbers 1, 2, 3, 4, 5, 8, 9, 10, 11, 14, and 15 are validated or disambiguated.

The disambiguation processing also compares, using the category cross reference database 170, theme concept/parent theme concept pairs to cross reference database pairs. This comparison yields a match between parent theme concept/ theme concept pairs: 11/1, 11/4, 14/1, 14/4, 15/1, and 15/4. The parent theme concept/theme concept comparisons are cumulative for this example such that theme entries 1, 4, 11, 14, and 15 were verified in the parent theme concept pair comparison.

For this preliminary document classification profile, the disambiguation processing also performs support style disambiguation. In one test for support style disambiguation, the theme strengths for the theme concept "financial_ investment" is totaled to yield a total theme strength of sixty five. The theme concept "banking", a child category to the parent category "finance and investment", is totaled to yield a total theme strength of 78.

For this example, the disambiguation processing attempts to validate the theme "banking" in the theme concept "financial_investment." Note that the term "banking" in general may refer to a maneuver of an airplane. For this context, "banking" would be classified in the "aircraft" category. Banking, a theme concept for themes "treasury bill yields", "yields", "federal fund rates", "reductions", and "rates." Because banking is itself a theme (e.g., theme # 1), then banking as a category classified for the above themes is validated. Thus, using this criteria of support style disambiguation, theme numbers 3, 6, 8, 9, and 10 are validated.

Combining Appropriate Themes

To generate a precise verified document classification profile for a document, the disambiguation processing performs a combining operation. The combining process attempts to merge themes that really identify the same idea or concept. For example, the proper noun "Oracle" and the proper noun "Oracle Corporation", when referring to a software company, are themes that connote the same meaning. For the following example, the theme "Oracle" is combined with the theme "Oracle Corporation." In one embodiment, to implement this type of combining, the disambiguation processing may use a lexicon that includes a list of words that indicate the combination of two entries (e.g., corporation).

The combining of terms or themes generally requires determining whether the themes should be combined. In one embodiment, the disambiguation processing identifies proper nouns, replaces the first letter with a lower case, if required, and then pluralizes the proper noun. If, after processing, the proper noun is another theme, then disambiguation processing cancels the processed proper noun, and adds the theme strength of the processed noun to the other theme. For example, a preliminary document classification profile may include the themes "Bush" and "bushes." The theme "Bush" may refer to the ex-president "George Bush", or "Bush", may be the first word of a sentence and may mean a form of vegetation. However, after processing the theme "Bush" and comparing it to a different theme "bushes" then the probability is that "Bush" is used in the context of a form of vegetation.

A Content Processing System

Figure 7:
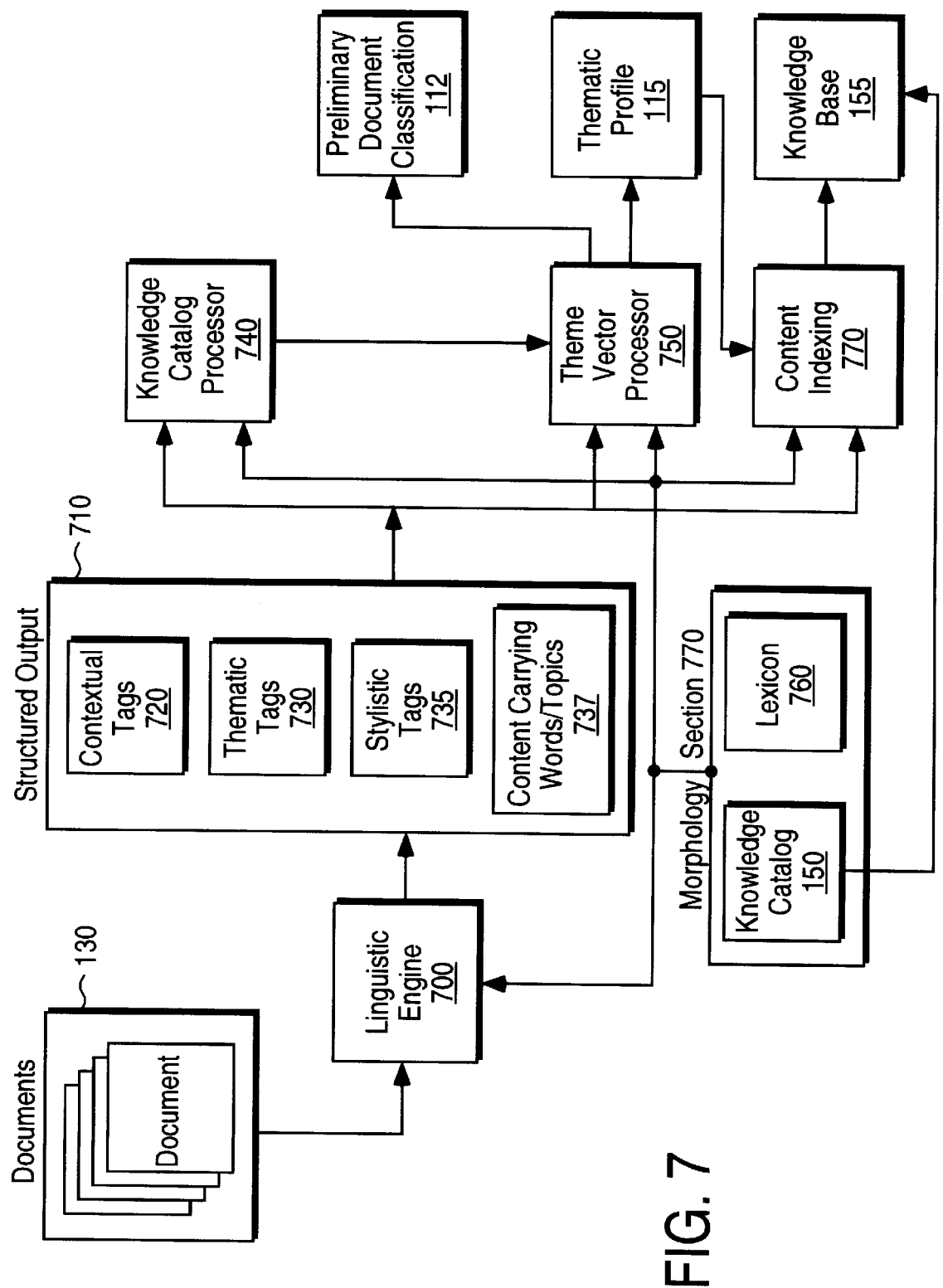
FIG. 7 is a block diagram illustrating one embodiment for a content processing system.

FIG. 7 is a block diagram illustrating one embodiment for a content processing system. In general, the content processing system 110 analyzes the document set 130 and generates the thematic profile 115 for use by the disambiguation processing 160. For this embodiment, the content processing system 110 includes a linguistic engine 700, a knowledge catalog processor 740, a theme vector processor 750, and a morphology section 770. The linguistic engine 700 receives, as input, the document set 130, and generates, as output, the structured output 710. The linguistic engine 700, which includes a grammar parser and a theme parser, processes the document set 130 by analyzing the grammatical or contextual aspects of each document, as well as analyzing the stylistic and thematic attributes of each document. Specifically, the linguistic engine 700 generates, as part of the structured output 710, contextual tags 720, thematic context output or thematic tags 730, and stylistic tags 735 that characterize each document. Furthermore, the linguistic engine extracts topics and content carrying words 737, through use of the thematic tags 730, for each sentence in the documents. In general, to generate the thematic context output or thematic tags 730, a theme parser, part of linguistic engine 700, tests the applicability of sentences of the documents with a plurality of thematic constructions. The thematic context output 730 includes thematic tags to indicate the applicability of the thematic constructions to the documents. A detailed description of a plurality of thematic contructions appears in U.S. patent application Ser. No. 08/454,602 now U.S. Pat. No. 5,708,822, inventor Kelly Wical, entitled "Method and Apparatus for Thematic Parsing of Discourse", filed May 31, 1995, which is expressly herein incorporated by reference. Also, for a detailed description of the contextual and thematic tags, see U.S. patent application Ser. No. 08/455,484 now pending, inventor Kelly Wical, entitled "Method and Apparatus for Determining Theme for Discourse", filed May 31, 1995, that includes an Appendix D, entitled "Analysis Documentation."

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phrases for each sentence in the documents, the context of the documents is defined. The chaos loop process stores information in the form of the contextual tags 720. U.S. patent application Ser. No. 08/455,484 now pending, inventor Kelly Wical, entitled "Method and Apparatus for Determining Theme for Discourse", filed May 31, 1995, includes an Appendix C, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 130. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see U.S. patent application Ser. No. 08/454,602 now U.S. Pat. No. 5,708,822, inventor Kelly Wical, entitled "Method and Apparatus for Thematic Parsing of Discourse", filed May 31, 1995.

As shown in FIG. 7, the morphology section 770 contains the knowledge catalog 150 and a lexicon 760. In general, the lexicon 760 stores definitional characteristics for a plurality of words and terms. For example, the lexicon 212 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix B, entitled "Lexicon Documentation", of U.S. patent application Ser. No. 08/455,484 now pending, inventor Kelly Wical, entitled "Method and Apparatus for Determining Theme for Discourse", filed May 31, 1995.

The topics and content carrying words 737 are input to the knowledge catalog processor 740. In part, the knowledge catalog processor 740 processes the content carrying words for direct use with the knowledge catalog 150. Specifically, the knowledge catalog processor 740 generates, as appropriate, the nominal or noun form of each content carrying word, as well as the count sense and mass sense of the word. Furthermore, the knowledge catalog processor 740 determines, from the knowledge catalog 150, which content carrying words are non ambiguous.

As shown in FIG. 7, the theme vector processor 750 receives the thematic tags 730 and contextual tags 720 from the structured output 710. In addition, the non ambiguous content carrying words from the knowledge catalog processor 740 are input to the theme vector processor 750. The content carrying words may include single words or phrases. The content carrying words output from the knowledge catalog processor 240 are converted to the noun or nominal form. In general, the theme vector processor 750 presents a thematic profile of the content of each document (e.g. generates the thematic profile 115) and classified documents in the knowledge catalog 150 (e.g. generates the preliminary document classification profile 112). To accomplish this, the theme vector processor 750 determines the relative importance of the non ambiguous content carrying words in the document set.

In one embodiment, the theme vector processor 750 generates a list of theme terms, including words and phrases, and assigns a relative theme strength to each theme term. The theme vector processor 750, through use of the knowledge catalog 150, generates a theme concept for each theme term by mapping the theme terms to categories in the knowledge catalog 150. Thus, the theme concepts indicate a general topic or category in the knowledge catalog 150 to identify the content of each document. In addition, the theme vector processor 750 generates, for each theme term, an importance number, a theme strength, and an overall capacity weight of collective content importance.

As discussed above, each theme identified in the thematic profile 115 is assigned a normalized or relative theme strength. The normalized theme strength is calculated using the theme strengths of each theme term in the text that contributes to the particular theme. At the sentence level, the theme vector processor 750 calculates a theme strength for each content carrying word in the sentence. The theme strength of the word measures the thematic weight of the word within the context of the sentence in which it appears. Prior to processing, each content carrying word receives a default theme strength that varies depending upon the word. As the theme vector processor 750 analyzes the surrounding text in the sentence to determine the thematic role of the word, it increases or decreases the theme strength for the word. For example, a theme grading determines how each word in a sentence is functioning within the context and structure of the sentence. The theme grading assigned to a word affects the theme strength for the word.

In one embodiment, the theme vector processor 750 executes a plurality of heuristic routines to generate the theme strengths for each theme. U.S. patent application Ser. No. 08/455,484 now pending, inventor Kelly Wical, entitled "Method and Apparatus for Determining Theme for Discourse", contains source code to generate the theme strengths in accordance with one embodiment for theme vector processing. The source code includes detailed comments to explain the operation of the code. Although the generation of the theme strengths is disclosed as computer source code, the theme strengths may be generated by any means, such as a hardware implementation, without deviating from the spirit or scope of the invention. Also, a further explanation of generating a thematic profile is contained in U.S. patent application Ser. No. 08/455,484 now pending, inventor Kelly Wical, entitled "Method and Apparatus for Determining Theme for Discourse", filed May 31, 1995, which is herein expressly incorporated by reference.

Dynamic Classification of Terminology

The content indexing processor 770 shown in FIG. 7 identifies index phrases including index heads and index context entries that relate to the index heads. The index heads are content carrying words from the documents but the words are not pre-defined categories in the classification hierarchy. For example, the term "OS/2", which defines a specific operating system, is a content carrying noun. However, in one embodiment of a classification hierarchy, "OS/2" is not a specific category. If the documents 130 include material on "OS/2", then "OS/2" is stored as an index head. The index context entries are index phrases that are used within the context of an index head. For the OS/2 example above, if a document contained information on the marketing of the OS/2 operating system, then "marketing" is stored as an index context entry for the index head "OS/2." Note that marketing may also be stored as an index head. Index heads are dynamically classified in the classification hierarchy, and that classification is stored with the index head.

The knowledge base 155, which includes categories classified for the documents 130, identifies relationships among index heads, index context entries, and themes. To identify these relationships, the knowledge base 155 includes an index table and an index/topic table. The index table contains index information from the documents 130, including the text and location of the index phrases. If the index context entry is not an index head, then the index table contains the parent or index head for the index context entry. The index/topic table contains cross references between indexes, stored in the index table, and categories classified in the preliminary document classification profile 112. For example, in one document, the index head "OS/2" may be mapped to the category "operating systems." For this example, the index/topic table reflects, for that document, the use of the term "OS/2" to connote an operating system. Therefore, the index/topic table provides a link between the index phrases and the categories in the classification hierarchy. A further explanation of generating a thematic profile is contained in U.S. patent application Ser. No. 08/455,484, inventor Kelly Wical, entitled "Method and Apparatus for Determining Theme for Discourse", filed May 31, 1995, which is herein incorporated by reference.

As discussed above, themes, which do not have a corresponding category in the classification hierarchy, are dynamically classified such that categories are generated to reflect terminology specific to a document. Once the new categories are generated, these categories are mapped into the pre-defined categories of the classification hierarchy.

In operation, the content indexing processor 770 receives themes from the thematic profile 115. In the preferred embodiment, categories in the classification hierarchy are based on noun concepts. Based on the contextual tags 720 and thematic tags 730, the content carrying words from the documents 130 are identified. The head words represent all content carrying words in the documents 130. Generally, all nouns contained in the documents 130 are candidates for head words. The content indexing processor 770 utilizes contextual tags 720 and thematic tags 730 to determine nouns that contain little or no content value. For example, the noun "copies", without any additional support, carries little content alone. Therefore, if a noun is characterized as "weak" from the contextual tags 720, thematic tags 730 or lexicon 760, then the noun is not utilized as a head word.

At this point, the content indexing processor 770 generates a plurality of head words, wherein each head word carries content. For each head word, at least one contextual relationship is noted. In one embodiment, the context for each head word is listed hierarchically such that a second contextual relationship to the head word is a more detailed relationship than the first contextual relationship for that head word. From these contextual relationships, the content indexing processor 770 develops categories not included in the classification hierarchy. Specifically, the new categories, arranged in a hierarchical structure, are dynamically generated based on head words and contextual relationships to the head words. After dynamically developing the new hierarchies, the content indexing processor 770 maps the dynamic hierarchies into pre-existing categories of the classification hierarchy. Thus, the content indexing processor 770 classifies terms of the documents 130 in the knowledge base 155 to extend the pre-existing categories of the classification hierarchy. For a further explanation of content indexing processing, see U.S. patent application, entitled "A Content Processing System for Discourse" Ser. No. 08/454, 745 now U.S. Pat. No. 5,694,523, filed May 31, 1995, inventor Kelly Wical, and is herein expressly incorporated by reference. U.S. patent application, entitled "A Content Processing System for Discourse" Ser. No. 08/454,745 now U.S. Pat. No. 5,694,523, includes Appendix I, entitled "Content Indexing Code", that contains a source code listing for implementing content indexing processing in accordance with one embodiment of the present invention.

Computer System

FIG. 8 illustrates a high level block diagram of a general purpose computer system in which the document classification system, including the disambiguation processing software of the present invention, may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the disambiguation processing system of the present invention is wholly or partially implemented in software, the main memory 1010 stores the executable code when in operation. The main memory 1010 may include banks of dynamic random access memory (DRAM) as well as high-speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 8 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive., is a non-volatile storage device for storing data and instructions for use by the processor unit 1005. In the software embodiment, the mass storage device 1020 stores the disambiguation processing software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the disambiguation processing software is stored on such a portable medium, and is input to the computer system 1000 via the portable storage medium drive 1040. The peripheral device (s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents may be input to the computer system 1000 via a portable storage medium or a network for processing by the disambiguation processing software.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The disambiguation processing may be implemented in either hardware or software. For the preferred software implementation, the disambiguation processing is software that includes a plurality of computer executable instructions for implementation on a general purpose computer system. Prior to loading into a general purpose computer system, the disambiguation processing software may reside as encoded information on a computer readable medium, such as a magnetic floppy disk, magnetic tape, and compact disc read only memory (CD-ROM). In one hardware implementation, circuits may be developed to perform the functions described herein. The knowledge catalog 150, knowledge database 155, and category cross reference database 170 may be implemented as a database stored in memory.

Although the present invention has been described in terms of specific exemplary embodiments, it will be appreciated that various modifications and alterations might be made by those skilled in the art without departing from the spirit and scope of the invention.

What is claimed is:

1. A computer-implemented method for validating a category classified for a theme in a document classification system, said method comprising the steps of:

processing at least one document by generating a thematic context output that indicates applicability of a plurality of thematic constructions, and by generating a plurality of themes from said thematic context output, wherein said themes define the overall content of said document;

storing a classification hierarchy that includes a plurality of categories;

receiving a plurality of categories that preliminarily classify said themes for said document;

selecting a theme from a document to validate a category preliminarily classified for said theme; and determining whether said category preliminarily classified for said theme selected is valid by analyzing relationships among said category preliminarily classified for said theme and other categories classified for different themes in said document.

2. The method as set forth in claim 1, wherein:

the step of storing a classification hierarchy comprisies the step of storing a classification hierarchy with said categories arranged in a hierarchical relationship; and the step of determining whether said preliminary classification for said theme is valid comprises the steps of:

identifying a category preliminarily classified for a first theme of said document that is a child category to a parent category preliminarily classified for a second theme of said document;

generating a theme strength for each theme, wherein said theme strength reflects a relative contribution of the overall content for said document;

comparing a theme strength of said first theme corresponding to said child category with a theme strength of said second theme corresponding to said parent category; and validating said child category as a classification for said first theme and validating said parent category as a classification for said second theme if said theme strength for said second theme is greater than said theme strength for said first theme.

3. The method as set forth in claim 1, wherein the step of determining whether said preliminary classification for said theme is valid comprises the steps of:

determining whether a theme identified for said document is also a category preliminarily classified for a different theme of said document;

determining whether a theme identified for said document is also a parent category of a category classified for a different theme of said document; and validating a category classified for a theme if said category, or a parent category for said category, is classified for a different theme.

4. The method as set forth in claim 1, wherein the step of determining whether said preliminary classification for said theme is valid comprises the steps of:

generating a theme strength for each theme, wherein said theme strength reflects a relative contribution of the overall content for said document;

generating a total theme strength for a category by summing all theme strengths for all themes classified in said category;

generating a total theme strength for a parent category of said category by summing all theme strengths for all themes classified under said parent category;

comparing said total theme strength for said parent category with said total theme strength for said category; and validating said category as a classification for said themes if said total theme strength for said parent category is greater than said total theme strength for said parent category.

5. A computer-implemented method for validating a category preliminarily classified for theme in a document classification system, said method comprising the steps of:

processing at least one document by generating a thematic context output that indicates applicability of a plurality of thematic constructions, and by generating a plurality of themes from said thematic context output, wherein said themes define the overall content of said document;

receiving a preliminary classification of categories for said themes in said document;

storing a category cross reference database that comprises a list of category cross reference pairs, wherein categories of a category pair have a semantic, linguistic, or use association;

selecting a theme from said document to validate a category preliminarily classified for said theme;

generating document category pairs by combining a category classified for said theme and each category classified for other themes in said document;

comparing said document category pairs with category cross reference database pairs to determine if a match occurs; and validating categories of a document category pair if a match between said document category pair and said category cross reference database pairs occurs.

6. The method as set forth in claim 5, further comprising the steps of:

extracting, from a classification hierarchy, parent categories for each category preliminarily classified for said themes;

generating parent document category pairs by combining a parent category for said category classified for said theme and each parent category for other categories classified for other themes;

comparing said parent document category pairs with category cross reference database pairs to determine if a match occurs; and validating a preliminary classification of said theme in a category if a match occurs.

7. The method as set forth in claim 5, further comprising the steps of:

extracting, from a classification hierarchy, parent categories for each category classified for said themes;

generating parent/child document category pairs by combining a parent category for said category classified for said theme and each category classified for other themes and by combining said category classified for said theme and each parent category for other categories classified for other themes;

comparing said parent/child document category pairs with cross reference database category pairs to determine if a match occurs; and validating classification of said theme in said category if a match occurs.

8. A computer-implemented method for classifying themes in a document, said method comprising the steps of:

determining whether themes in said document are completely ambiguous;

assigning a category for each theme to preliminarily classify each theme under said category if a theme is not completely ambiguous; and determining, for themes assigned a category, whether a category classified for a theme is valid by analyzing other categories classified for other themes of said document.

9. A computer readable medium comprising a plurality of instructions, which when executed by a computer, causes the computer to perform the steps of:

processing at least one document by generating a thematic context output that indicates applicability of a plurality of thematic constructions, and by generating a plurality of themes from said thematic context output, wherein said themes define the overall content of said document;

storing a classification hierarchy that includes a plurality of categories;

receiving a plurality of categories that preliminarily classify said themes for said document;

selecting a theme from a document to validate a category preliminarily classified for said theme; and determining whether said category preliminarily classified for said theme selected is valid by analyzing relationships among said category preliminarily classified for said theme and other categories classified for different themes in said document.

10. The computer readable medium as set forth in claim 9, wherein:

the instructions for storing a classification hierarchy comprise instructions for storing a classification hierarchy with said categories arranged in a hierarchical relationship; and the instructions for determining whether said preliminary classification for said theme is valid comprise instructions for:

identifying a category preliminarily classified for a first theme of said document that is a child category to a parent category preliminarily classified for a second theme of said document;

generating a theme strength for each theme, wherein said theme strength reflects a relative contribution of the overall content for said document;

comparing a theme strength of said first theme corresponding to said child category with a theme strength of said second theme corresponding to said parent category; and validating said child category as a classification for said first theme and validating said parent category as a classification for said second theme if said theme strength for said second theme is greater than said theme strength for said first theme.

11. The computer readable medium as set forth in claim 9, wherein the instructions for determining whether said preliminary classification for said theme is valid comprise instructions for:

determining whether a theme identified for said document is also a category preliminarily classified for a different theme of said document;

determining whether a theme identified for said document is also a parent category of a category classified for a different theme of said document; and validating a category classified for a theme if said category, or a parent category for said category, is classified for a different theme.

12. The computer readable medium as set forth in claim 9, wherein the instructions for determining whether said preliminary classification for said theme is valid comprise instructions for:

generating a theme strength for each theme, wherein said theme strength reflects a relative contribution of the overall content for said document;

generating a total theme strength for a category by summing all theme strengths for all themes classified in said category;

generating a total theme strength for a parent category of said category by summing all theme strengths for all themes classified under said parent category;

comparing said total theme strength for said parent category with said total theme strength for said category; and validating said category as a classification for said themes if said total theme strength for said parent category is greater than said total theme strength for said parent category.

13. A computer readable medium comprising a plurality of instructions, which when executed by a computer, causes the computer to perform the steps of:

processing at least one document by generating a thematic context output that indicates applicability of a plurality of thematic constructions, and by generating a plurality of themes from said thematic context output, wherein said themes define the overall content of said document;

receiving a preliminary classification of categories for said themes in said document;

storing a category cross reference database that comprises a list of category cross reference pairs, wherein categories of a category pair have a semantic, linguistic, or use association;

selecting a theme from said document to validate a category preliminarily classified for said theme;

generating document category pairs by combining a category classified for said theme and each category classified for other themes in said document;

comparing said document category pairs with category cross reference database pairs to determine if a match occurs; and validating categories of a document category pair if a match between said document category pair and said category cross reference database pairs occurs.

14. The computer readable medium as set forth in claim 13, further comprising instructions for:

extracting, from a classification hierarchy, parent categories for each category preliminarily classified for said themes;

generating parent document category pairs by combining a parent category for said category classified for said theme and each parent category for other categories classified for other themes;

comparing said parent document category pairs with category cross reference database pairs to determine if a match occurs; and validating a preliminary classification of said theme in a category if a match occurs.

15. The computer readable medium as set forth in claim 13, further comprising instructions for:

extracting, from a classification hierarchy, parent categories for each category classified for said themes;

generating parent/child document category pairs by combining a parent category for said category classified for said theme and each category classified for other themes and by combining said category classified for said theme and each parent category for other categories classified for other themes;

comparing said parent/child document category pairs with cross reference database category pairs to determine if a match occurs; and validating classification of said theme in said category if a match occurs.

16. A computer readable medium comprising a plurality of instructions, which when executed by a computer, causes the computer to perform the steps of:

receiving a document comprising a plurality of themes;

determining whether said themes in a document are completely ambiguous;

assigning a category for each theme to preliminarily classify each theme under said category if a theme is not completely ambiguous; and determining, for themes assigned a category, whether a category classified for a theme is valid by analyzing other categories classified for other themes of said document.

17. A computer system comprising:

memory for storing a plurality of themes for a document;

processor unit for determining whether said themes in said document are completely ambiguous, for assigning a category for each theme to preliminarily classify each theme under said category if a theme is not completely ambiguous, and for determining, for themes assigned a category, whether a category classified for a theme is valid by analyzing other categories classified for other themes of said document.

* * * * *